US008646241B2

(12) United States Patent
Lemoine (10) Patent No.: US 8,646,241 B2
(45) Date of Patent: Feb. 11, 2014

(54) INTERCOUPLED PIPING ASSEMBLY (75) Inventor: George Lemoine, Trumbull, CT (US)

(73) Assignee: ShelterLogic Corp., Watertown, CT (US)

( * ) Notice: Subject to any disclaimer, the term of this patent is extended or adjusted under 35 U.S.C. 154(b) by 19 days.

(21) Appl. No.: 13/336,426

(22) Filed: Dec. 23, 2011

(65) Prior Publication Data

US 2012/0234418 A1 Sep. 20, 2012

Related U.S. Application Data (60) Provisional application No. 61/454,184, filed on Mar. 18, 2011.

(51) Int. Cl.
*E04H 12/00* (2006.01)
(52) U.S. Cl.
USPC .......................... 52/653.2; 52/648.1; 403/385
(58) Field of Classification Search
USPC ............ 52/648.1, 653.1, 653.2, 654.1, 655.1;
248/316.5; 403/196, 218, 233, 385,
403/388, 389, 390, 391, 395, 396, 400;
135/114, 102.1, 120.3, 909
See application file for complete search history.

(56) References Cited

U.S. PATENT DOCUMENTS

| | | | |
|---|---|---|---|
| 1,963,981 A | 6/1934 | Garrett | |
| 2,020,102 A * | 11/1935 | Burton et al. | 403/385 |
| 2,088,890 A * | 8/1937 | Winby et al. | 403/188 |
| 2,101,317 A | 12/1937 | Lemieux | |
| 2,392,932 A | 1/1946 | Macbeth | |
| 2,494,826 A * | 1/1950 | Mulder | 403/385 |
| 3,861,816 A | 1/1975 | Zaidan | |
| 4,077,730 A * | 3/1978 | Zaidan | 403/385 |
| 4,289,417 A | 9/1981 | Mandell | |
| 4,440,519 A | 4/1984 | Pennel et al. | |
| 4,497,389 A * | 2/1985 | Whitlam et al. | 182/150 |
| 5,111,770 A * | 5/1992 | Weelink | 119/523 |
| 5,181,355 A | 1/1993 | Skolnick et al. | |
| 5,779,387 A * | 7/1998 | Schonauer | 403/400 |
| 5,839,707 A * | 11/1998 | Barringer | 248/214 |
| 5,878,546 A * | 3/1999 | Westover | 52/719 |
| 6,786,302 B2 * | 9/2004 | Liew et al. | 182/186.8 |
| 6,837,019 B2 * | 1/2005 | Collie | 52/712 |
| 7,090,427 B2 * | 8/2006 | Petratto | 403/400 |
| 7,377,472 B2 | 5/2008 | Brown et al. | |
| 7,784,744 B2 | 8/2010 | Becker | |
| 7,896,573 B2 * | 3/2011 | Zaguroli | 403/400 |
| 2008/0202574 A1 | 8/2008 | Milano et al. | |

* cited by examiner

Primary Examiner — William Gilbert
Assistant Examiner — Gisele Ford
(74) Attorney, Agent, or Firm — Carmody Torrance Sandak & Hennessey LLP (57) ABSTRACT An intercoupled piping assembly comprising first and second elongated pipes, and a coupler for orthogonally coupling them together. A preferred embodiment provides for the intercoupling piping assembly to be used in connection with tubular building structures having a plurality of elongated pipes coupled together to form a coverable structure and a fabric to cover the structure.

8 Claims, 9 Drawing Sheets

INTERCOUPLED PIPING ASSEMBLY

CROSS REFERENCE TO RELATED APPLICATION

This application claims the benefit of U.S. Provisional Application No. 61/454,184, filed Mar. 18, 2011, the subject matter of which is herein incorporated by reference in its entirety.

BACKGROUND OF THE INVENTION

The present invention relates generally to piping assemblies, and in particular, to an improved intercoupling piping assembly for use in tubular building constructions that improves the strength of the overall building construction as well as having other advantages, such as but not limited to, reducing "racking," which may occur under certain conditions, such as but not limited to, during high wind conditions. In a particular embodiment, although not limited thereto, the present invention is highly advantageous in tabular building constructions that are fabric covered, where lightweight design and the elements, such as wind and snow conditions, must be factored into the construction and projected durability of the final structure.

Single pipe metal tubular buildings with fabric covering are very desirable. However, one of the problems encountered by these structures is their tendency to "rack," whereby the tubes to move out of their 90° orientation with each other, causing the tendency of the structure to lean. High winds are one of the most common causes of this "racking" problem.

Figure 1A:
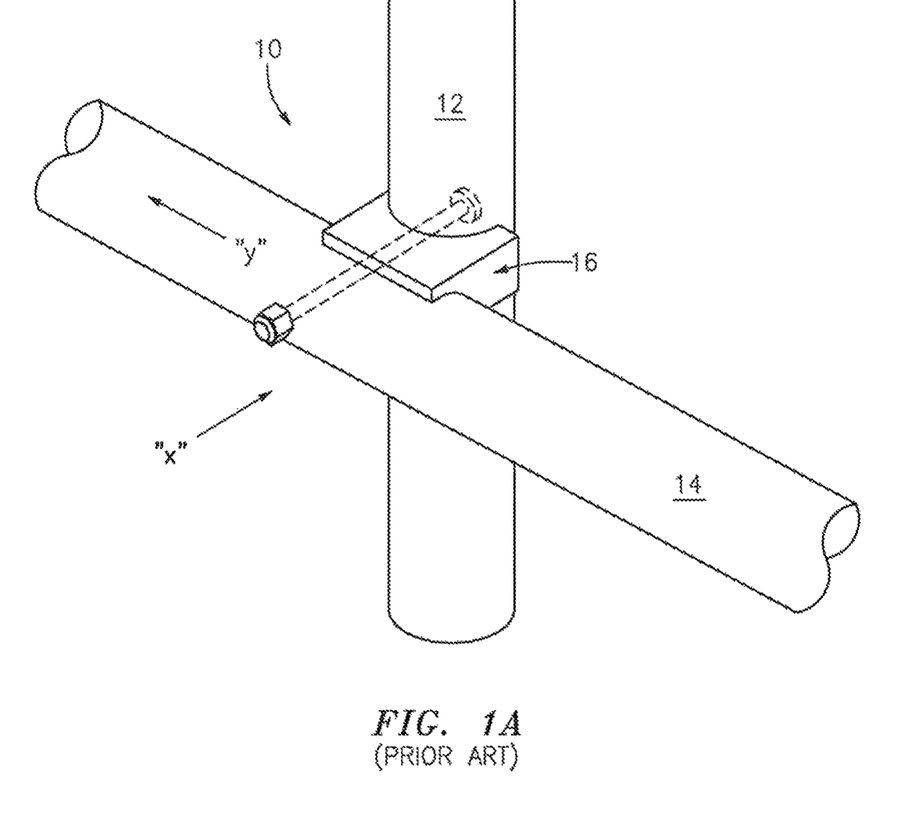
FIGS. 1A and 1B are perspective and cross-sectional views, respectively, of an intercoupled piping assembly constructed in accordance with the prior art.
Figure 1B:
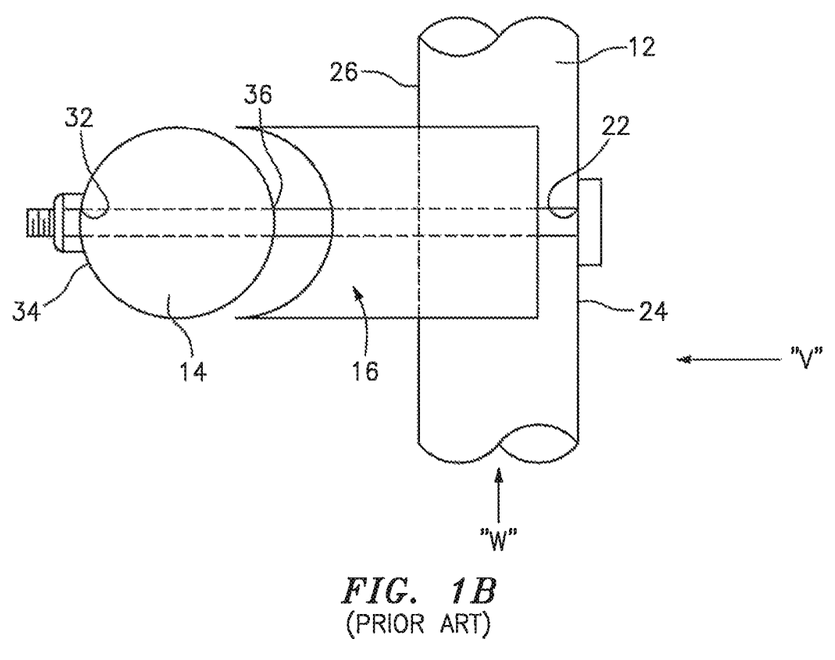

U.S. Published Application No. 2008/0202574 describes a recent improvement over the prior art, and FIGS. 1A and 1B of the instant application illustrate an intercoupling piping assembly made in accordance with the aforementioned '574 application.

However, it is believed that further advances in the art are desirable and have been achieved. As but one example, it has been found that a surprising degree of improved building strength can be achieved by reconfiguring the securing arrangement of the pipes to the coupling device, which is thus provided by the present invention. Other advantages and improvements of the present invention over the state of the art are disclosed herein.

SUMMARY AND OBJECTIVES OF THE PRESENT INVENTION

It is thus an objective of the present invention to improve the coupling of pipes and other tubular members than that found in the prior art.

For example, it is an objective of the present invention to provide an improved intercoupled piping assembly that still further reduces and/or eliminates "racking" in building constructions.

Another objective and advantage of the present invention is to provide an intercoupled piping assembly that provides for improved strength in building constructions.

It is yet another objective of the present invention to provide a tubular structure that provides for an increased snow load.

It is yet another objective to provide a method of constructing a tubular structure that utilizes the intercoupling piping assembly disclosed herein.

It is yet another objective of the present invention to provide an improved intercoupled piping assembly that allows for relatively quick assembly and disassembly, while at the same time, achieving the other objectives and advantages set forth herein.

Yet another objective of the present invention is to provide an improved intercoupled piping assembly that is both easy to utilize and manufacture and also that achieves all of the advantages and objectives set forth herein.

Further objects and advantages of this invention will become more apparent from a consideration of the drawings and ensuing description.

The invention accordingly comprises the features of construction, combination of elements, arrangement of parts and sequence of steps which will be exemplified in the construction, illustration and description hereinafter set forth, and the scope of the invention will be indicated in the claims.

To overcome the perceived deficiencies in the prior art and to achieve the objects and advantages set forth above and below, the present invention is, generally speaking, directed to an intercoupled piping assembly. In a preferred embodiment, the intercoupled piping assembly comprises a first elongated pipe having a first aperture in a first side surface and a second aperture in an opposite side surface, wherein the alignment of the first and second apertures is in a direction at least essentially orthogonal to the first elongated pipe's direction of elongation; a second elongated pipe having a first aperture in a first side surface and a second aperture in an opposite side surface, wherein the alignment of the first and second apertures is in a direction at least essentially orthogonal to the second elongated pipe's direction of elongation; a coupler for coupling the first elongated pipe to the second elongated pipe, wherein the coupler comprises: a first sidewall and a second sidewall at least essentially in facing alignment, wherein the first and second sidewalls create a first receiving section for receiving a portion of the first elongated pipe, a third sidewall and a fourth sidewall in at least essentially facing alignment, wherein the third and fourth sidewalls create a second receiving section, orthogonally oriented relative to the first receiving section, for receiving a portion of the second elongated pipe, wherein when the first elongated pipe is positioned in the first receiving section and the second elongated pipe is positioned in the second receiving section, the first elongated pipe is at least essentially orthogonally positioned relative to the second elongated pipe, wherein (i) the first sidewall includes an aperture and the second sidewall includes an aperture and (ii) the third sidewall includes an aperture and the fourth sidewall includes an aperture; and a securing assembly comprising: a first elongated member that extends through the aperture in the first sidewall, the first aperture in the first side surface of the first elongated pipe, through the second aperture in the opposite side surface of the first elongated pipe and through the aperture in the second sidewall; and a second elongated member that extends through the aperture in the third sidewall, the first aperture in the first side surface of the second elongated pipe, through the second aperture in the opposite side surface of the second elongated pipe and through the aperture in the fourth sidewall; whereby the first and second elongated pipes are intercoupled via the coupler and are resisted from shifting from their orthogonal alignment due to their respective coupling to the coupler.

Also provided herein is a preferred tubular building structure comprising a plurality of elongated pipes coupled together to form a coverable structure; wherein at least two of the elongated pipes form part of an intercoupled piping assembly as set forth above.

Still further, a preferred method of constructing an intercoupled piping assembly is provided. Yet further, the present invention is directed to the various embodiments of couplers disclosed herein and used in the intercoupled piping assembly as set forth above and herein.

BRIEF DESCRIPTION OF THE DRAWINGS

The above set forth and other features of the invention are made more apparent in the ensuing Description of the Preferred Embodiments when read in conjunction with the attached Drawings, wherein.

Identical reference numerals in the figures are intended to indicate like parts, although not every feature in every figure may be called out with a reference numeral.

DETAILED DESCRIPTION OF THE PREFERRED EMBODIMENTS

Reference is first made to FIGS. 1A and 1B, which show an intercoupled piping assembly constructed in accordance with the prior art. As illustrated therein, the intercoupled piping assembly ("assembly") 10 comprises a first elongated pipe 12 having an aperture 22 extending therethrough from a first side surface 24 to an opposite side surface 26 in a direction ("v") orthogonal to its direction of elongation ("w") and a second elongated pipe 14 having an aperture 32 extending therethrough from a first side surface 34 to an opposite side surface 36 in a direction ("x") orthogonal to its direction of elongation ("y"). As used throughout this application, "direction orthogonal to its direction of elongation," it is intended to explain descriptively that the apertures are through the diameter of the pipe(s) and not along the entire elongated length of the pipes.

Assembly 10 of FIGS. 1A and 1B also includes a coupler, generally indicated at 16, for coupling first elongated pipe 12 to second elongated pipe 14. As illustrated, coupler 16 comprises a first recess for receiving a portion of first elongated pipe 12 and a second recess for receiving a portion of second elongated pipe 14. A securing assembly ensures that first elongated pipe 12, second elongated pipe 14 and coupler 16 remain coupled together by at least in part an elongated member, such as a bolt. As also used herein, "at least in part" should be understood to mean that other securing or adhering means, such as adhesive or the like, may additionally (but not necessarily) be used. In this way, first and second elongated pipes 12, 14 are intercoupleable via coupler 16 and are resisted from shifting from their orthogonal alignment due to their respective coupling to coupler 16.

On the other hand, reference will now be made to FIGS. 2-10, which illustrate preferred embodiments of intercoupled piping assemblies in accordance with preferred embodiments of the present invention. Generally speaking, the intercoupled piping assemblies of the present invention enable two pipes to be joined to form a perpendicular joint wherein the joining bracket is stronger than the attaching pipe. As will be disclosed in greater detail below, each tube has (preferably) a bolt passing through a tab (or sidewall) on either side of the tube (or pipe) and a hole through the center of the tube/pipe. A bolt passes through the bracket (i.e. sidewalls thereof) and tube. Preferably, a nut is applied on the opposite side of the bracket (herein also referred to as a "coupler") and tightened. Because the bolt passes through the lesser loaded neutral fiber of the tube that is under significantly less tensile and compressive stress, the structural integrity of the tube is preserved. Torsional loading is directed over a larger area and is shared by both tubes multiplying the strength of the joint beyond that of a single tube. The increased torsional loading is enhanced by the compression of the bracket to the tube relieving the bolt hole in the tube of work carrying loads and therefore neutralizing the stress concentration of the single bolt through the hole.

As should be understood by those in the art, the coupler (or joining bracket) can be made from many materials and processes such as, but not limited to, Formed Sheet Metal, Molded Plastic, Molded Composite, Cast or Machined Metals. It is desirable to have sets of tabs (e.g. sidewalls) integral with a single base plate wherein tabs are oriented perpendicular from one side of the base plate to the other. The brackets (i.e. couplers) can be designed for use with mixed sizes of tubing for the vertical and horizontal structural tubes.

The couplers in accordance with the present invention may be of various configurations, with the preferred embodiments being disclosed herein.

Figure 2:
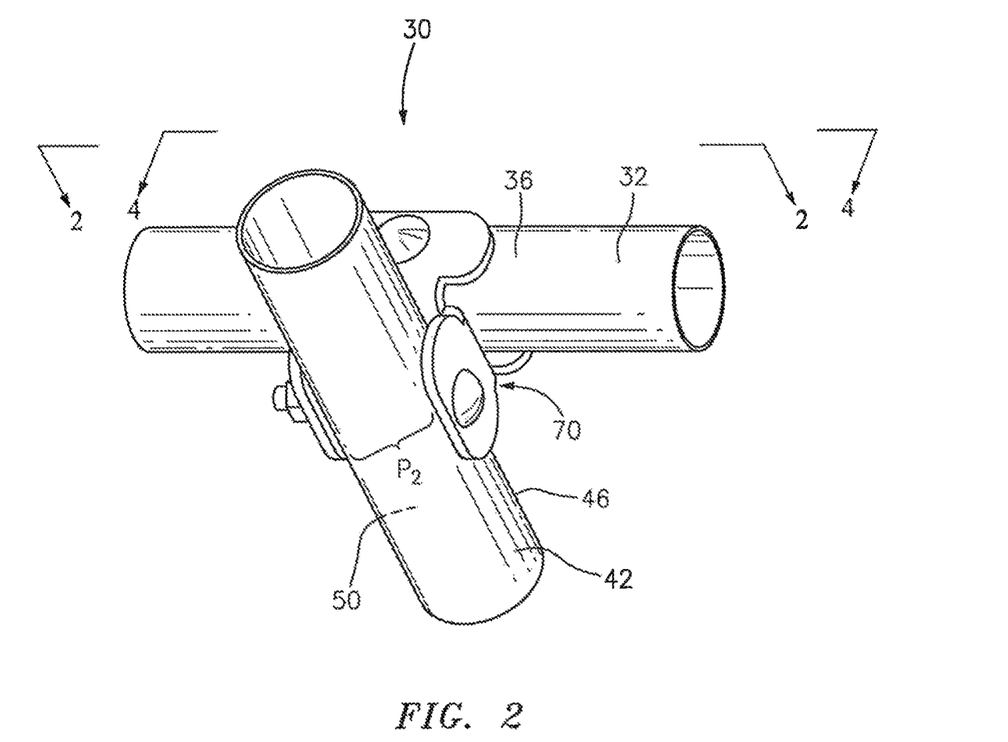
FIG. 2 is a perspective view of an intercoupled piping assembly constructed in accordance with a first embodiment of the present invention.
Figure 3:
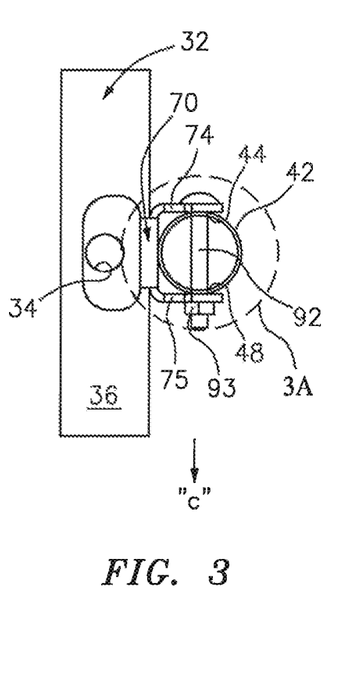
FIG. 3 is a view of the intercoupled piping assembly of FIG. 2 taken along lines 3-3.
Figure 3A:
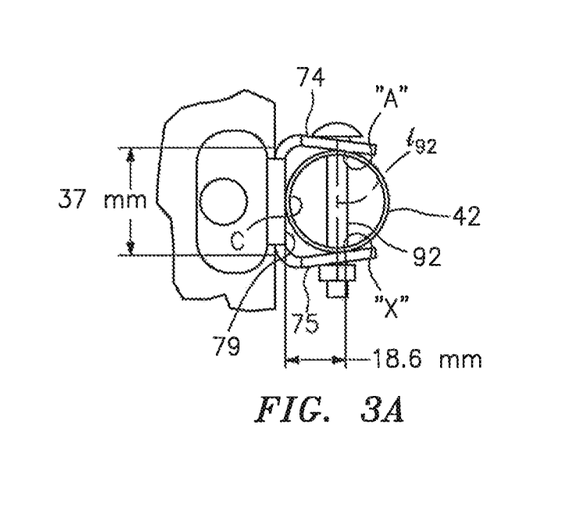
FIG. 3A is an enlarged section of FIG. 3 showing more particularly the three (3) points of contact of coupler 70 upon pipes 32 and 42.
Figure 4:
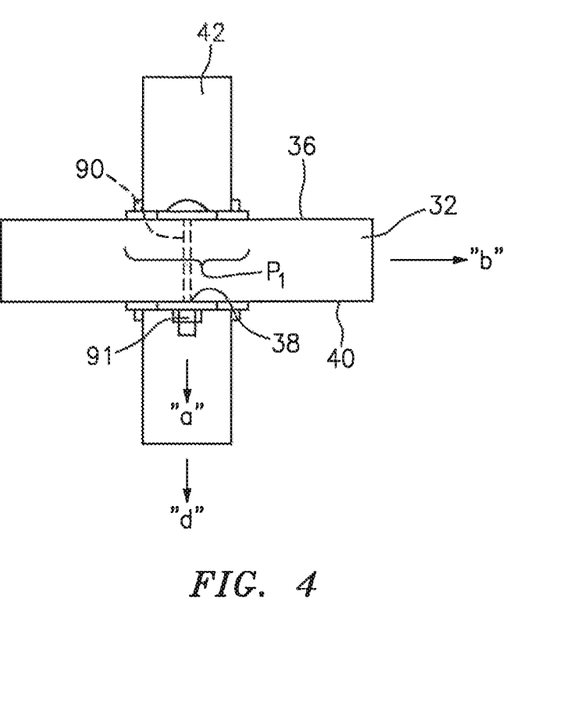
FIG. 4 is a view of the intercoupled piping assembly of FIG. 2 taken along lines 4-4.

For example, reference is first made to FIGS. 2-4, which illustrates an intercoupled piping assembly, generally indicated at 30, constructed in accordance with a first embodiment of the present invention.

In this first embodiment, intercoupled piping assembly 30 ("assembly 30") preferably comprises a first elongated pipe 32 having a first aperture 34 in a first side surface 36 and a second aperture 38 in an opposite side surface 40, wherein the alignment of the first and second apertures is in a direction at least essentially orthogonal (e.g. in a direction indicated by arrow "a") to the first elongated pipe's direction of elongation (e.g. in a direction indicated by arrow "b"). By the qualifier "at least essentially" it is meant that "perfect" alignment of the holes is not necessary and a reasonable degree of variation is both acceptable and possibly even expected using conventional machine tools, as one skilled in the art would clearly understand.

Assembly 30 further comprises a second elongated pipe 42 having a first aperture 44 in a first side surface 46 and a second aperture 48 in an opposite side surface 50, wherein the alignment of the first and second apertures is in a direction at least essentially orthogonal (e.g. in a direction indicated by arrow "c") to the second elongated pipe's direction of elongation (e.g. in a direction indicated by arrow "d").

Figure 12:
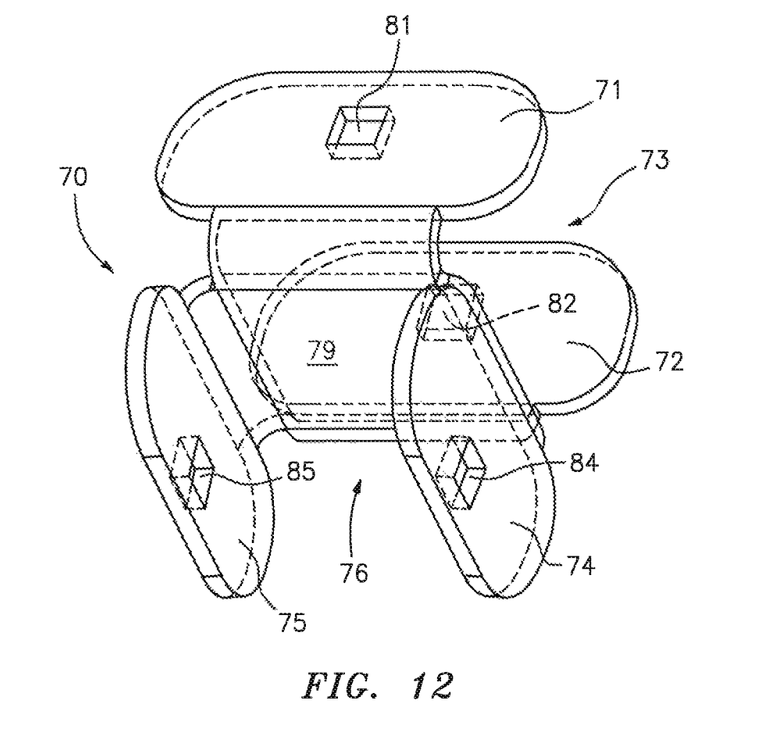
FIG. 12 is a perspective view of a coupler constructed in accordance with the embodiments of the present invention.

Assembly 30 also comprises a coupler, generally indicated at 70, and also shown specifically in FIG. 12, for coupling the first elongated pipe 32 to the second elongated pipe 42, wherein the coupler comprises a first sidewall 71 and a second sidewall 72 at least essentially in facing alignment, wherein the first and second sidewalls create a first receiving section 73 for receiving a portion (e.g. $p_1$) of the first elongated pipe 32. Similarly, in this context, the qualifier "at least essentially in facing alignment" it is meant that "perfect" parallel alignment of the sidewalls is not necessary (and in fact may not be desired as discussed below) and a reasonable degree of variation (whether by use of e.g. conventional machine tools or intentional (see FIGS. 5-10 below)) is both acceptable and possibly desirable as would be understood by those skilled in the art.

Coupler 70 also comprises a third sidewall 74 and a fourth sidewall 75 in at least essentially facing alignment, wherein the third and fourth sidewalls create a second receiving section 76, oriented orthogonally relative to the first receiving section 73, for receiving a portion (e.g. $p_2$) of the second elongated pipe 42, wherein when the first elongated pipe is positioned in the first receiving section and the second elongated pipe is positioned in the second receiving section, the first elongated pipe is at least essentially orthogonally positioned relative to the second elongated pipe.

As illustrated and in a preferred embodiment, the first receiving section 73 and the first and second sidewalls 71, 72 are of a general U-shape, the same to be said of the second receiving section 76 and third and fourth sidewalls 74, 75. As illustrated in FIG. 12, these U-shaped brackets may be orthogonally coupled or connected together by means of a backplate 79. Preferably, coupler 70 is a one-piece integrally formed component, such as by bending and/or stamp-cutting of the materials mentioned above. As depicted in each of the embodiments disclosed herein, first sidewall 71 includes an aperture 81 and the second sidewall 72 includes an aperture 82 and the third sidewall 74 includes an aperture 84 and the fourth sidewall 75 includes an aperture 85. In a preferred embodiment, the apertures are square-shaped, but round or other shaped holes can be acceptable.

Assembly 30 further comprises a securing assembly, preferably comprising a first elongated member 90 that extends through the aperture in the first sidewall 71, the first aperture in the first side surface 36 of the first elongated pipe 32, through the second aperture in the opposite side surface 40 of the first elongated pipe 32 and through the aperture 82 in the second sidewall 72; and a second elongated member 92 that extends through the aperture 84 in the third sidewall 74, the first aperture 44 in the first side surface 46 of the second elongated pipe 42, through the second aperture 48 in the opposite side surface 50 of the second elongated pipe 42 and through the aperture 85 in the fourth sidewall 75. In this way, the first and second elongated pipes are intercoupleable via the coupler 70 and are resisted from shifting from their orthogonal alignment due to their respective coupling to the coupler.

In this first preferred embodiment of FIGS. 2-4 and as seen in FIGS. 3 and 3A clearly, it can be seen that the bracket (e.g. sidewalls 74, 75) is wider than the tubing (e.g. pipe 42) allowing for assembly of the pipe 42. When clamped, the tabs (e.g. sidewalls 74, 75) close onto the side of the pipe(s) forcing it into a three point contact region clamping the tube firmly. This is applicable for sidewalls 71, 72 and pipe 32 as well. In particular, and in accordance with an important feature of the present invention. FIG. 3A highlights the feature of the sidewall pairs (e.g. walls 71, 72 and 74, 75) contacting the respective tubes just slightly in front of the position of the bolt. For example, as illustrated in FIG. 3A, sidewall 74 contacts pipe 42 at region "A" which is slightly in front of bolt 92. Similarly, sidewall 75 contacts pipe 42 at the region marked with an "X" which is also slightly in front bolt 92. It is intended that regions "A" and "X" are equidistant from backplate 79. Backplate 79 also contacts pipe 42 at contact region "C," This configuration, which can be patentably differentiated from the more conventional compression arrangement as illustrated in U.S. Pat. No. 3,861,816, for example where arms 6, 7, 8, 9 simply compress the tubular scaffolding from the sides, significantly improves the structural integrity of pipe 42 and thus the assembly 30 itself. A similar clamping and contact arrangement is preferred with respect to sidewalls 71, 72 and pipe 32. Preferably, for a pipe having a diameter of 34 mm, it is preferable that contact regions "A" and "X" are approximately 18.6 mm from the surface of backplate 79 as illustrated in FIG. 3A. This measurement is approximately 1-3 mm greater than the radius of the respective pipe(s), which is thus clearly to be in front of the bolt and illustrated in FIG. 3A (i.e. of the nearest inner wall of the respective aperture in the sidewall.).

For purposes of clarity, the figures and the disclosure herein make clear that the third sidewall 74 and the fourth sidewall 75 each respectively contact the second elongated pipe 42 at respective first and second contact regions ("A," "X"), wherein neither the first contact region "A" nor the second contact region "X" is along the longitudinal axis $l_{92}$ of the second elongated member 92 but rather are each offset from the longitudinal axis of the second elongated member on the side surface of the second elongated pipe such that the longitudinal axis of the second elongated member 92 is intermediate each of the first and second contact regions "A" and "X" and the backplate 79, and further wherein there is no direct contact between the third sidewall 74 and the second elongated pipe 42 nor between the fourth sidewall 75 and the second elongated pipe 42 on the side surface of the second elongated pipe 42 intermediate the longitudinal axis of the second elongated member 92 and the backplate 79. That is, FIG. 3A shows specifically how the "A" and "X" regions of contact are not along the side surface where the bolt 92 goes through the holes of pipe 42 but are rather in front (i.e. to the right of the longitudinal axis of the bolt 92 when viewing FIG. 3A such that the bolt 92 is positioned to the right of the backplate 79), of the bolt thereby applying a somewhat "inward" and compression force of pipe 42 against the backplate 42. This is superior to simply applying a side compression force as illustrated in the prior art, such as in U.S. Pat. No. 3,861,816.

As would be understood in the art, a similar advantageous arrangement is provided with respect to pipe 32 set in region 73, wherein the first sidewall and the second sidewall each respectively contact the first elongated pipe at respective first and second contact regions, wherein neither the first nor the second contact region is along the longitudinal axis of the first elongated member but rather are each offset from the longitudinal axis of the first elongated member on the side surface of the first elongated pipe such that the longitudinal axis of the first elongated member is intermediate each of the first and second contact regions and the backplate, and further wherein there is no direct contact between the first sidewall and the first elongated pipe nor between the second sidewall and the first elongated pipe on the side surface of the first elongated pipe intermediate the longitudinal axis of the first elongated member and the backplate.

Figure 5:
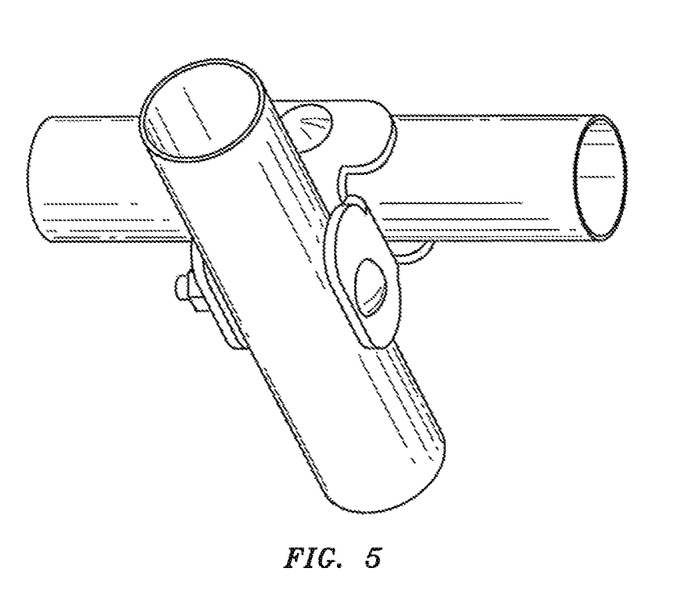
FIG. 5 is a perspective view of an intercoupled piping assembly constructed in accordance with a second embodiment of the present invention.
Figure 6:
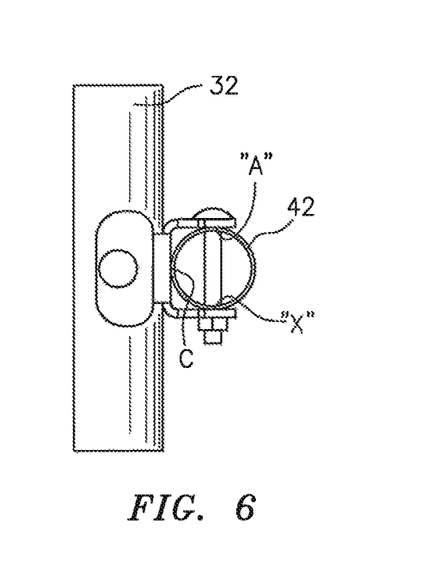
FIG. 6 is a view of the intercoupled piping assembly of FIG. 5 taken along lines 6-6.
Figure 7:
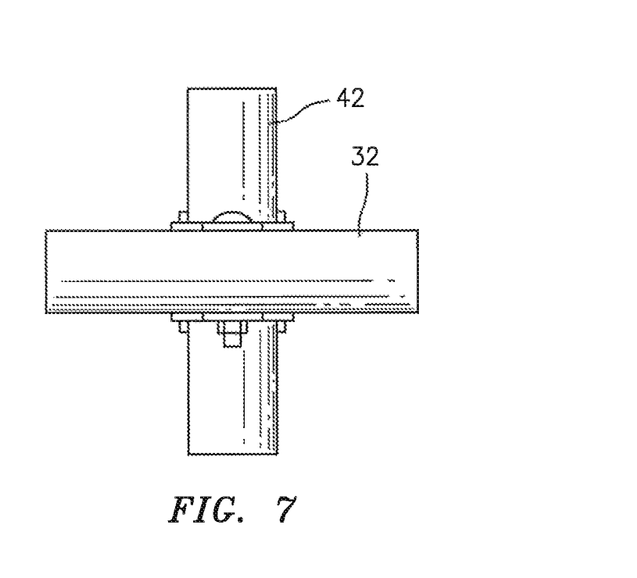
FIG. 7 is a view of the intercoupled piping assembly of FIG. 5 taken along lines 7-7.

Reference is now made to FIGS. 5-7, the embodiment of which is similar to that depicted in FIGS. 2-4, with the primary distinction being that the spacing around the bracket (e.g. sidewalls 71, 72 as a pair and sidewalls 74, 75 as a pair) are increased to allow an increased folding of the joiner bracket tabs (i.e. respective sidewall pairs) and the tube/pipe(s), thus allowing the top edge of the bracket tabs to extend farther over the top of the tube to achieve a more equal spacing of the three contact surfaces around the respective pipe(s). However, in all other material respects, the first and second embodiments are the same. Importantly, here again, the respective sidewalls 74, 75 contact pipe 42 at point "A" and "X," respectively, with the backplate 79 contacting pipe 42 at contact point "C." A similar clamping and contact arrangement is preferred with respect to sidewalls 71, 72 and pipe 32.

Figure 8:
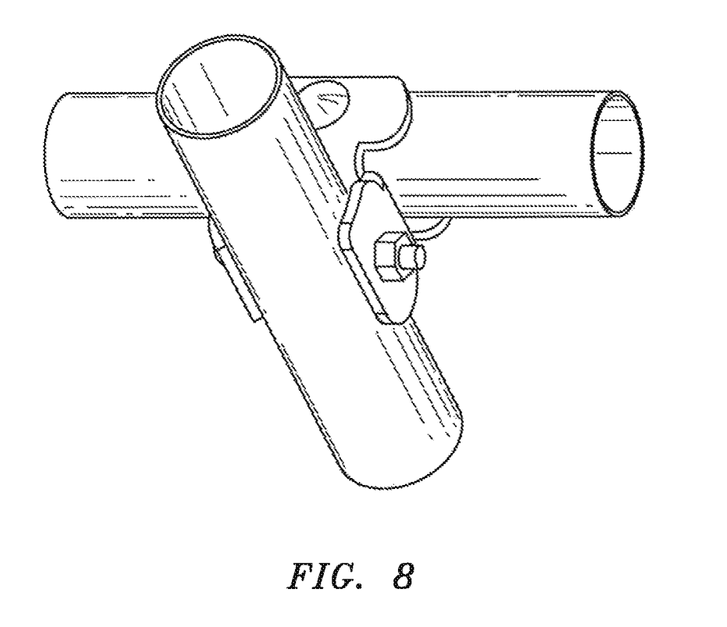
FIG. 8 is a perspective view of an intercoupled piping assembly constructed in accordance with a third embodiment of the present invention.
Figure 9:
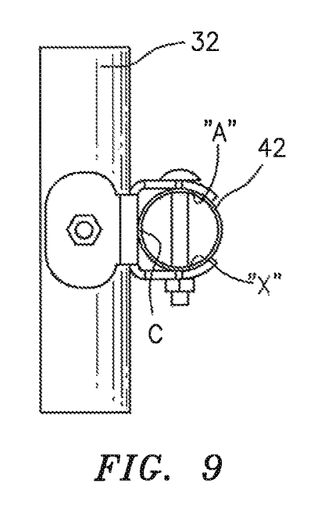
FIG. 9 is a view of the intercoupled piping assembly of FIG. 8 taken along lines 9-9.
Figure 10:
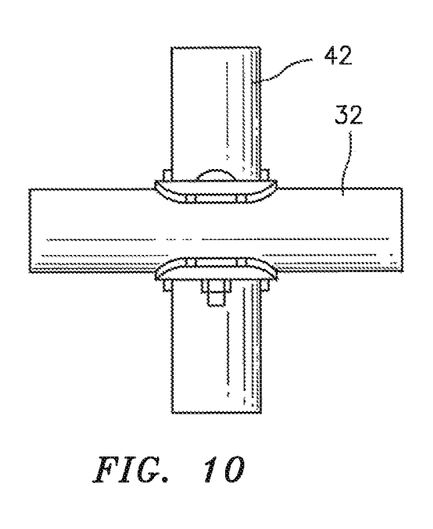
FIG. 10 is a view of the intercoupled piping assembly of FIG. 8 taken along lines 10-10.

Reference is next made to FIGS. 8-10, the embodiment of which is similar to that depicted in FIGS. 2-4 and FIGS. 5-7, with the primary distinction being that the tabs (i.e. sidewall pairs) are bent still further with an angle (or a radius) to more evenly grasp the respective pipe(s) 32 and/or 42 while increasing contact surface area. However, in all other material respects, this third embodiment is similar to those of the first and second embodiments. That is, here again, the respective sidewalls 74, 75 contact pipe 42 at point "A" and "X," respectively, with the backplate 79 contacting pipe 42 at contact point "C." A similar clamping and contact arrangement is preferred with respect to side walls 71, 72 and pipe 32.

In accordance with other features of the present invention, assembly 30 may comprise a first securing member 91, such as a nut, for ensuring the first sidewall, the first elongated pipe and the second sidewall remain coupled together by at least in part the first elongated member 90; and a second securing member 93 for ensuring that the third sidewall, the second elongated pipe and the fourth sidewall remain coupled together by at least in part the second elongated member 92. In a specific embodiment, the first and second securing members 91, 93 are releasably lockable to a respective accessible end of the respective elongated members. For example, in a specific embodiment, each of the elongated members may be a bolt with a head, with the securing members being a nut that may be threadably coupled to the accessible ends. The securing assemblies may also include washers as would be appreciated by those skilled in the art.

Figure 11:
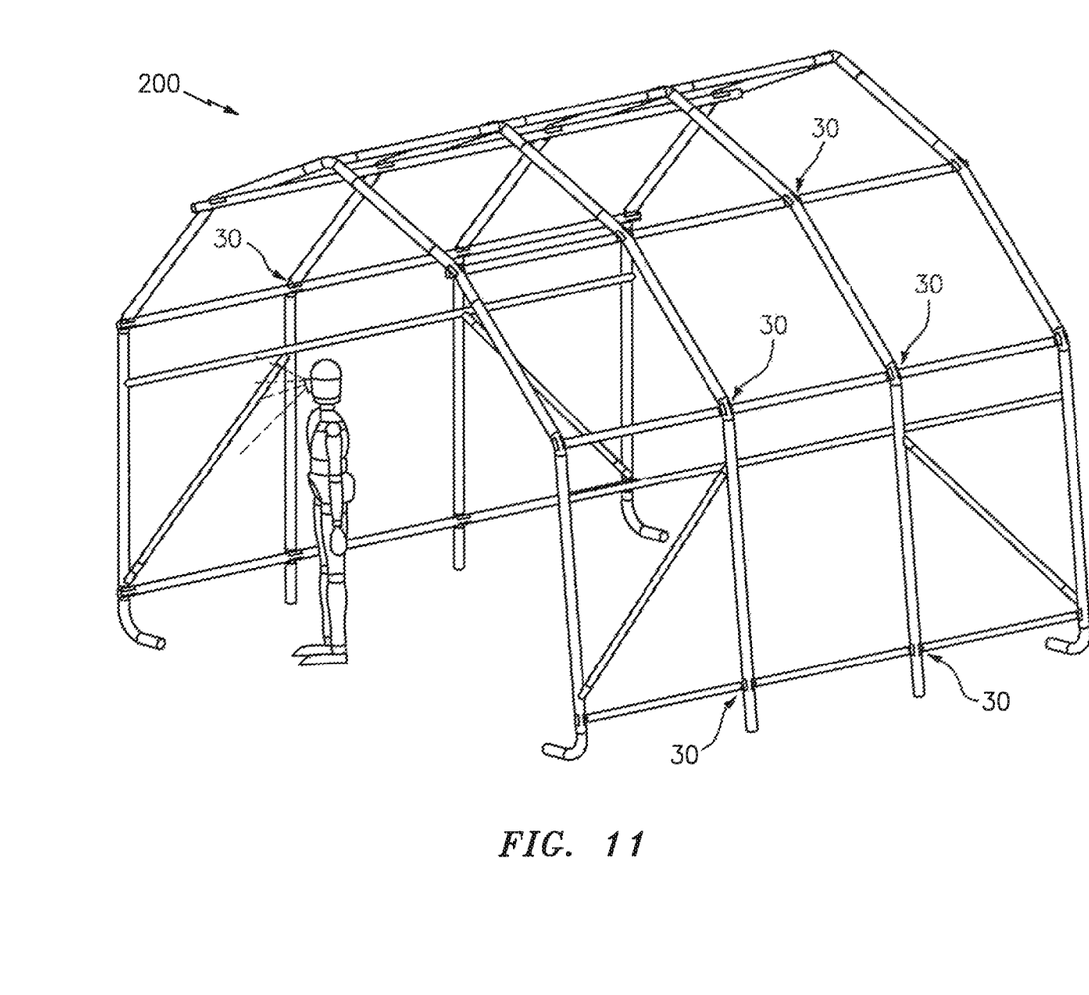
FIG. 11 is an exemplary tubular structure that utilizes one or more of the intercoupled piping assemblies constructed in accordance with the present invention.

Reference is now made to FIG. 11, which shows an exemplary tubular structure, generally indicated at 200, which utilizes one or more of the intercoupled piping assemblies 30. Structure 200 is preferably comprised of tubular piping, similar in type to pipes 32 and 42. The general construction and design of structure 200 is known in the art. Improving among other things, the strength and integrity of structure 200, are one or more intercoupled piping assemblies 30. Fabric is then preferably used to cover structure 200. The manner in which the fabric is used and provided on structure 200 is known to those skilled in the art.

Testing to demonstrate and substantiate the remarkable and surprising advantages of the present invention over the prior art were performed, and in particular, to test, substantiate and document the increased strength and reliability of tensioned fabric shelters, such as for example and not limitation, sheds, garages and greenhouses. Two different failure modes, described below, have been seen in prior art shelters, which have been improved upon by the present invention, namely:

1. In the prior art shelters, the rib will tend to fail at a cross drilled hole from the outer cord to the inner at the top pipe or cross rails, which can be caused by wind or snow loading and an individual rib set which can be loaded to the failure point easily thus causing a chain reaction failure. So removing the outer to inner holes along a rib makes the building stronger.
2. In the prior art shelters, there is a possible compromise in the stability of the building structure due to wind loads.

Test One: Cross-Drilled Hole Force Measurements

A. Test Setup:
  1. A steel plate was bolted to the floor with tubes welded to the horizontal plate with a cross drilled hole to secure the test tubes. The fixture holds the tubes parallel to the floor.
  2. A steel strap was used to connect the end of the pipe to the scale on the chain hoist lifting the free end vertically.
  3. Each test tube had the lifting holes 12 inches from the point of predicted failure.

B. Results:
  1. Testing Configurations:
     A. Plain tube with only holes for the fixture and lifting bail.
     B. Tube as above but with the hole facing vertically simulating the coupler of FIGS. 1, 1A or bolt-together frame with wind braces.
     C. Tube with holes horizontal in accordance with the present invention.
     D. Tube as in "B" above with a 28 mm tube simulating a cross rail.
  2. Each configuration was tested three times with new parts (results are in foot pounds of force):

| Tubing | 1 | 2 | 3 | Ave |
|---|---|---|---|---|
| No Hole Pipe-in-pipe - 34 mm | 300 | 290 | 300 | 297 |
| Vertical Hole - 34 mm | 240 | 240 | 240 | 240 |
| Horizontal Hole - 34 mm | 280 | 280 | 290 | 283* |
| Vertical Hole - 34 mm w/ Cross Bar | 250 | 250 | 250 | 250 |

Figure 13:
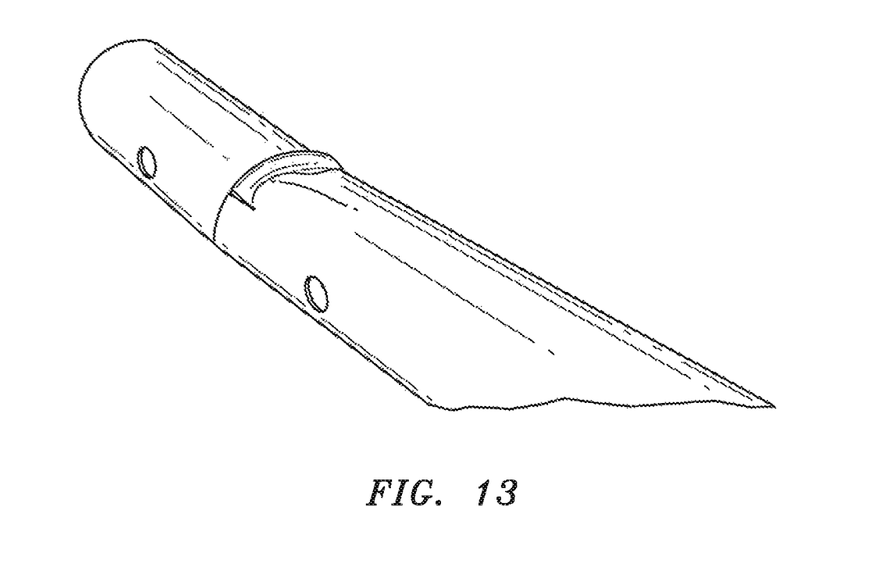
FIGS. 13-15 illustrate pipe failures conducted in accordance with the testing set forth herein.
Figure 14:
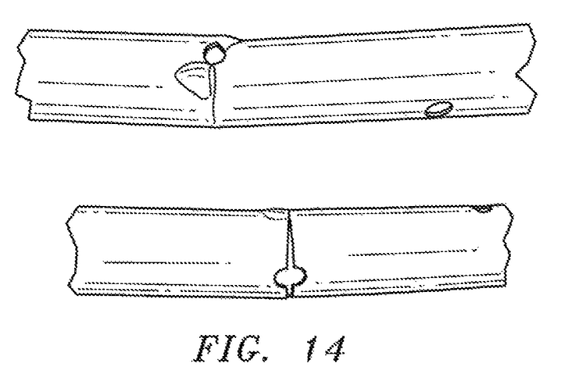
Figure 15:
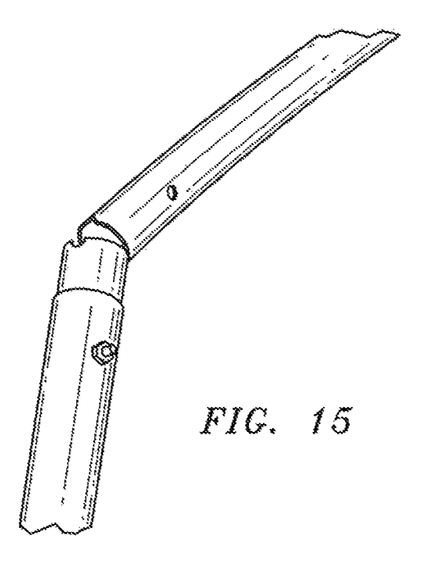

*Failure point was three inches farther from target failure point of the hole (results are equivalent to no hole failure load (see FIG. 13). FIGS. 14 and 15 illustrate the "vertical hole" test samples after failure, which are similar to piping aligned in accordance with the prior art (e.g using the coupler of FIGS. 1, 1A).

Test Two; Torsional Strength

Two rib sets were assembled and bolted to the floor. The chain hoist was attached to a strap that was connected to the far side of the frame set at the truss and swaged connections to simulate the wind load. The straps are held apart with a cover rail so that the load is perpendicular to the rib section to simulate wind pressure directly into the side of the building. The lower rafter pipes were assembled so that three of the bending dents were oriented on the upper end and one on the lower end of the rafter.

| | 1 | 2 | 3 | ft-lbs |
|---|---|---|---|---|
| Tubing to Tubing single Bolt | | | | |
| 38 × 34 ShelterLock | <10 | <10 | <10 | <10 |
| 38 × 34 34 × 28 Steel ShelterLock | 200 150 | 200 150 | 200 150 | 200 150 |
| 38 × 34 34 × 34 | 1300 1100 | 1300 1110 | 1300 1090 | 1300 1100 |

From the foregoing, it can be concluded that the revised hole orientation as set forth in the preferred embodiments (i.e.

perpendicular to the load) shows an improvement in strength over the hole inline with the force load. Assuming that wind on the largest panels would be the sides of the structure and snow loading from the top would apply the load radially around the rib; that loading the outer cord of any given member would be the highest load and therefore the most likely failure mode. Therefore there is a distinct advantage in changing the orientation of the mounting holes from the outer cord to the neutral tensor perpendicular to the outer cord.

Observations from the foregoing charts include:

1. with no coupler: pipe moves below readable load (would require wind bracing)

2. pipe-in-pipe connection, the inner pipe fails at 290-300 ft lbs.

3. using the configuration of FIGS. 1, 1A, assembly twists and does not hold a load at 150-200 ft-lbs.

4. with a coupler constructed in accordance with the present invention, one observes slight movement at 250 ft-lbs, pipe fails at 1,100 ft-lbs. (smallest size)

Moreover, one would have expected an increase in strength just less than twice the 290-300 foot pounds of force rather than in excess of three times the breaking strength of the tubing itself. This result is surprising and the test has been repeated twice to verify test methods and results. It is believed that the surprising test results are directly attributed to the configuration of the assembly as set forth in the present invention, including the unique three (3) contact point coupling configuration as shown and disclosed herein. In particular, the present invention provides for improved structural integrity and removes the failure points described above.

While the dimensions of coupler may ultimately be dictated by design characteristics of the structure 200, preferably the depth of each receiving section 73, 76 is at least ½ the distance of the diameter of the pipes 32, 42. The dimensions provided above with respect to the diameters of the tubing are in millimeters.

It can thus be seen that the present invention is advantageous and overcomes the perceived deficiencies in the prior art. For example, the present invention provides an improved intercoupled piping assembly that improves the strength of the building construction and additionally reduces and/or eliminates "racking," for example, and not limitation, due to higher than desirable wind for use in a tubular building structure that is fabric covered. Additionally, the present invention provides a tubular structure that provides for an increased snow load. Moreover, in view of the preferred components and construction, it can be seen that the present invention allows for relatively quick assembly and disassembly, while at the same time, achieving the other objectives set forth herein.

It will thus be seen that the Objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It should also be understood that the following claims are intended to cover all of the generic and specific features of the invention described herein and all statements of the scope of the invention that as a matter of language might fall there between.

What is claimed is:

1. An intercoupled piping assembly comprising:
   a first elongated pipe having a first aperture in a first side surface and a second aperture in an opposite side surface, wherein the alignment of the first and second apertures is in a direction at least essentially orthogonal to the first elongated pipe's direction of elongation;
   a second elongated pipe having a first aperture in a first side surface and a second aperture in an opposite side surface, wherein the alignment of the first and second apertures is in a direction at least essentially orthogonal to the second elongated pipe's direction of elongation;
   a coupler for coupling the first elongated pipe to the second elongated pipe, wherein the coupler comprises:
      a first sidewall and a second sidewall at least essentially in facing alignment, wherein the first and second sidewalls create a first receiving section for receiving a portion of the first elongated pipe,
      a third sidewall and a fourth sidewall in at least essentially facing alignment, wherein the third and fourth sidewalls create a second receiving section, orthogonally oriented relative to the first receiving section, for receiving a portion of the second elongated pipe, wherein when the first elongated pipe is positioned in the first receiving section and the second elongated pipe is positioned in the second receiving section, the first elongated pipe is at least essentially orthogonally positioned relative to the second elongated pipe,
      wherein (i) the first sidewall includes an aperture and the second sidewall includes an aperture and (ii) the third sidewall includes an aperture and the fourth sidewall includes an aperture; and
   a securing assembly comprising:
      a first elongated member that extends through the aperture in the first sidewall, the first aperture in the first side surface of the first elongated pipe, through the second aperture in the opposite side surface of the first elongated pipe and through the aperture in the second sidewall; and
      a second elongated member that extends through the aperture in the third sidewall, the first aperture in the first side surface of the second elongated pipe, through the second aperture in the opposite side surface of the second elongated pipe and through the aperture in the fourth sidewall;
   whereby the first and second elongated pipes are intercoupled via the coupler and are resisted from shifting from their orthogonal alignment due to their respective coupling to the coupler.

2. The intercoupled piping assembly as claimed in claim 1, comprising a first backplate surface, wherein the first sidewall and the second sidewall each respectively contact the first elongated pipe at respective first and second contact regions, wherein neither the first nor the second contact region is along the longitudinal axis of the first elongated member but rather are each offset from the longitudinal axis of the first elongated member on the side surface of the first elongated pipe such that the longitudinal axis of the first elongated member is intermediate each of the first and second contact regions and the first backplate surface, and further wherein there is no direct contact between the first sidewall and the first elongated pipe nor between the second sidewall and the first elongated pipe on the side surface of the first elongated pipe intermediate the longitudinal axis of the first elongated member and the first backplate surface.

3. The intercoupled piping assembly as claimed in claim 2, comprising a second backplate surface, wherein the third sidewall and the fourth sidewall each respectively contact the second elongated pipe at respective first and second contact regions, wherein neither the first nor the second contact region is along the longitudinal axis of the second elongated member but rather are each offset from the longitudinal axis of the second elongated member on the side surface of the second elongated pipe such that the longitudinal axis of the second elongated member is intermediate each of the first and second contact regions and the second backplate surface, and further wherein there is no direct contact between the third sidewall and the second elongated pipe nor between the fourth sidewall and the second elongated pipe on the side surface of the second elongated pipe intermediate the longitudinal axis of the second elongated member and the second backplate surface.

4. The intercoupled piping assembly as claimed in claim 1, comprising a first securing member for ensuring the first sidewall, the first elongated pipe and the second sidewall remain coupled together by at least in part the first elongated member; and a second securing member for ensuring that the third sidewall, the second elongated pipe and the fourth sidewall remain coupled together by at least in part the second elongated member.

5. The intercoupled piping assembly as claimed in claim 4, wherein the first and second securing members are releasably lockable to a respective accessible end of the respective elongated members.

6. A tubular building structure comprising:
   a plurality of elongated pipes coupled together to form a coverable structure;
   wherein at least two of the elongated pipes form part of an intercoupled piping assembly as claimed in claim 1.

7. A coupling assembly for intercoupling a first elongated pipe and a second elongated pipe, wherein the first elongated pipe comprises a first aperture in a first side surface and a second aperture in an opposite side surface, wherein the alignment of the first and second apertures is in a direction at least essentially orthogonal to the first elongated pipe's direction of elongation and the second elongated pipe comprises a first aperture in a first side surface and a second aperture in an opposite side surface, wherein the alignment of the first and second apertures is in a direction at least essentially orthogonal to the second elongated pipe's direction of elongation, wherein the coupling assembly comprises:
   a coupler comprising:
      a first sidewall and a second sidewall at least essentially in facing alignment, wherein the first and second sidewalls create a first receiving section for receiving a portion of the first elongated pipe,
      a third sidewall and a fourth sidewall in at least essentially facing alignment, wherein the third and fourth sidewalls create a second receiving section, orthogonally oriented relative to the first receiving section, for receiving a portion of the second elongated pipe, wherein when the first elongated pipe is positioned in the first receiving section and the second elongated pipe is positioned in the second receiving section, the first elongated pipe is at least essentially orthogonally positioned relative to the second elongated pipe,
      wherein (i) the first sidewall includes an aperture and the second sidewall includes an aperture and (ii) the third sidewall includes an aperture and the fourth sidewall includes an aperture; and
   a securing assembly comprising:
      a first elongated member that extends through the aperture in the first sidewall, the first aperture in the first side surface of the first elongated pipe, through the second aperture in the opposite side surface of the first elongated pipe and through the aperture in the second sidewall; and
      a second elongated member that extends through the aperture in the third sidewall, the first aperture in the first side surface of the second elongated pipe, through the second aperture in the opposite side surface of the second elongated pipe and through the aperture in the fourth sidewall;
   whereby the first and second elongated pipes are intercoupled via the coupler and are resisted from shifting from their orthogonal alignment due to their respective coupling to the coupler.

8. The coupling assembly as claimed in claim 7, comprising a first securing member for ensuring the first sidewall, the first elongated pipe and the second sidewall remain coupled together by at least in part the first elongated member; and a second securing member for ensuring that the third sidewall, the second elongated pipe and the fourth sidewall remain coupled together by at least in part the second elongated member.

* * * * *